US012655658B2

(12) United States Patent
Lehner, Jr.

(10) Patent No.: US 12,655,658 B2
(45) Date of Patent: Jun. 16, 2026

(54) LOCKING AND UNLOCKING ARRANGEMENTS FOR EXIT DEVICE ASSEMBLIES FOR DOORS

(71) Applicant: Schlage Lock Company LLC, Carmel, IN (US)

(72) Inventor: Jack R. Lehner, Jr., Indianapolis, IN (US)

(73) Assignee: Schlage Lock Company LLC, Carmel, IN (US)

( * ) Notice: Subject to any disclaimer, the term of this patent is extended or adjusted under 35 U.S.C. 154(b) by 493 days.

(21) Appl. No.: 18/318,973

(22) Filed: May 17, 2023

(65) Prior Publication Data

US 2024/0384578 A1 Nov. 21, 2024

(51) Int. Cl.
*E05B 65/10* (2006.01)

(52) U.S. Cl.
CPC .......... *E05B 65/1046* (2013.01); *E05B 65/10* (2013.01); *E05B 65/1006* (2013.01)

(58) Field of Classification Search
CPC .. E05B 65/10; E05B 65/1006; E05B 65/1046; E05B 65/1053; E05B 65/1086; E05B 65/1093; E05B 65/106; E05B 65/1066; E05B 65/1073
See application file for complete search history.

(56) References Cited

U.S. PATENT DOCUMENTS

| | | | | | |
|---|---|---|---|---|---|
| 1,372,168 | A * | 3/1921 | Goodman | E05B 13/004 | 70/210 |
| 7,634,927 | B1 * | 12/2009 | Tien | E05B 65/10 | 70/DIG. 60 |
| 9,273,495 | B2 * | 3/2016 | Tien | E05B 65/10 | |
| 9,435,141 | B2 * | 9/2016 | Tien | E05B 65/1046 | |
| 9,945,158 | B2 | 4/2018 | Lehner, Jr. et al. | | |
| 10,370,872 | B2 | 8/2019 | Pfunder et al. | | |
| 10,745,942 | B2 | 8/2020 | Lehner, Jr. et al. | | |
| 11,459,798 | B2 | 10/2022 | Arlinghaus et al. | | |
| 2003/0196461 | A1 * | 10/2003 | Liou | E05B 67/24 | 70/38 A |
| 2022/0389740 | A1 | 12/2022 | Hoiland et al. | | |
| 2024/0328208 | A1 * | 10/2024 | Arlinghaus | E05B 65/1053 | |
| 2025/0003257 | A1 * | 1/2025 | Woodley | E05B 65/10 | |

* cited by examiner

*Primary Examiner* — Alyson M Merlino
(74) *Attorney, Agent, or Firm* — Taft Stettinius & Hollister LLP

(57) ABSTRACT

An exit device assembly includes a pushbar assembly configured for mounting to an egress side of the door, a trim configured for mounting to a non-egress side of the door, at least one remote latch mechanism on the egress side of the door, a latch control mechanism mounted to the door for manipulating the at least one remote latch mechanism, a key mechanism on the non-egress side of the door separate from the trim, and a trim lock device on the egress side of the door. The trim lock device is operable to prevent ingress through the door via the trim, while restricted ingress is provided by the key mechanism while the trim is locked from the egress side. The pushbar assembly is operable to always provide egress.

19 Claims, 12 Drawing Sheets

LOCKING AND UNLOCKING ARRANGEMENTS FOR EXIT DEVICE ASSEMBLIES FOR DOORS

TECHNICAL FIELD

The present disclosure generally relates to exit device assemblies for doors, and more particularly but not exclusively relates to systems and methods for locking and/or unlocking such exit device assemblies.

BACKGROUND

Exit devices are commonly installed on doors to provide for egress from an area. Such exit devices typically have a latchbolt that is actuated by a pushbar of the exit device to enable opening of the door from the egress side of the door. Typically, such exit devices will further include an exterior trim with a handle that is installed to the non-egress side of the door to permit for retraction of the latchbolt from the exterior or non-egress side of the access-controlled area. In certain conditions, such as during storms and other emergency events, the handle of the non-egress side trim may be unintentionally manipulated or impacted by debris that causes the exterior trim to undesirably actuate the latchbolt.

Certain buildings may include one or more interior rooms that are to be used as an emergency shelter. For example, schools may use a hardened location, such as an auditorium or gymnasium, as a storm shelter. Doors into these areas are typically unlocked for normal use, and also able to be locked for security and/or safety, such as during a storm event. Therefore, it is desirable to be able to provide various functional modes for the exit devices, and to be able to change the exit device functionality based on a user input from the egress side of the door. For these reasons among others, there remains a need for further improvements in this technological field.

SUMMARY

An exemplary exit device assembly for a door includes a pushbar assembly for mounting to an egress side of the door, and a trim with a manual handle for mounting to a non-egress side of the door. The pushbar assembly and the trim are both connected to a latch control mechanism, and the latch control mechanism is connected to at least one remote latch mechanism with a control rod. The latch control mechanism includes an unactuated state in which the remote latch mechanism secures the door in a closed position, and an actuated state in which the remote latch mechanism is controlled by the latch control mechanism to allow the door to be moved from the closed position.

The exit device assembly further includes a key mechanism on the non-egress side of the door that is not part of the trim. The key mechanism includes a lock cylinder for receiving a key, and a manual actuator that is connected to the control rod. When the lock cylinder is unlocked with the key, the manual actuator can be manipulated to actuate the latch control mechanism by axially displacing the control rod connected between the latch control mechanism and the remote latch mechanism.

The exit device assembly also includes a trim lock device on the egress side of the door. The trim lock device is movable by a user on the egress side of the door with an input device between a blocking position and an unblocking position. In the blocking position, the trim lock device retains the handle of the trim in a rigid state, and in the unblocking position the trim lock device permits movement of the handle to manipulate latch control mechanism to the actuated state.

In an embodiment, the trim lock device is manually moved to the unblocking position with the input device, and does not require a key. In another embodiment, a key is required to move the trim lock device. In the unblocking position, the remote latch mechanism can be displaced by the latch control mechanism to allow the door to open by operation of the handle on the trim or by operation of the pushbar assembly, allowing unrestricted ingress and egress through the door, respectively.

In an embodiment, the trim lock device on the egress side of the door is manually moved to the blocking position by a user on the egress side without a key. In this position, the handle on the exterior trim is "rigid" and cannot be used to manipulate the latch control mechanism, either purposefully or by accident. However, the pushbar assembly on the egress side of the door always remains operable to manipulate the latch control mechanism to open the door for egress purposes.

When the trim lock device is in the blocking position, ingress through the door is restricted and only provided by the key mechanism on the non-egress side of the door. The key is inserted into the lock cylinder, and the lock cylinder is unlocked and maintained in the unlocked position so the manual actuator can be manually manipulated to actuate the latch control mechanism by axially displacing the connector rod connected to the latch control mechanism on the egress side of the door.

Further embodiments, forms, features, and aspects of the present application shall become apparent from the description and figures provided herewith

DETAILED DESCRIPTION OF ILLUSTRATIVE EMBODIMENTS

Figure 1:
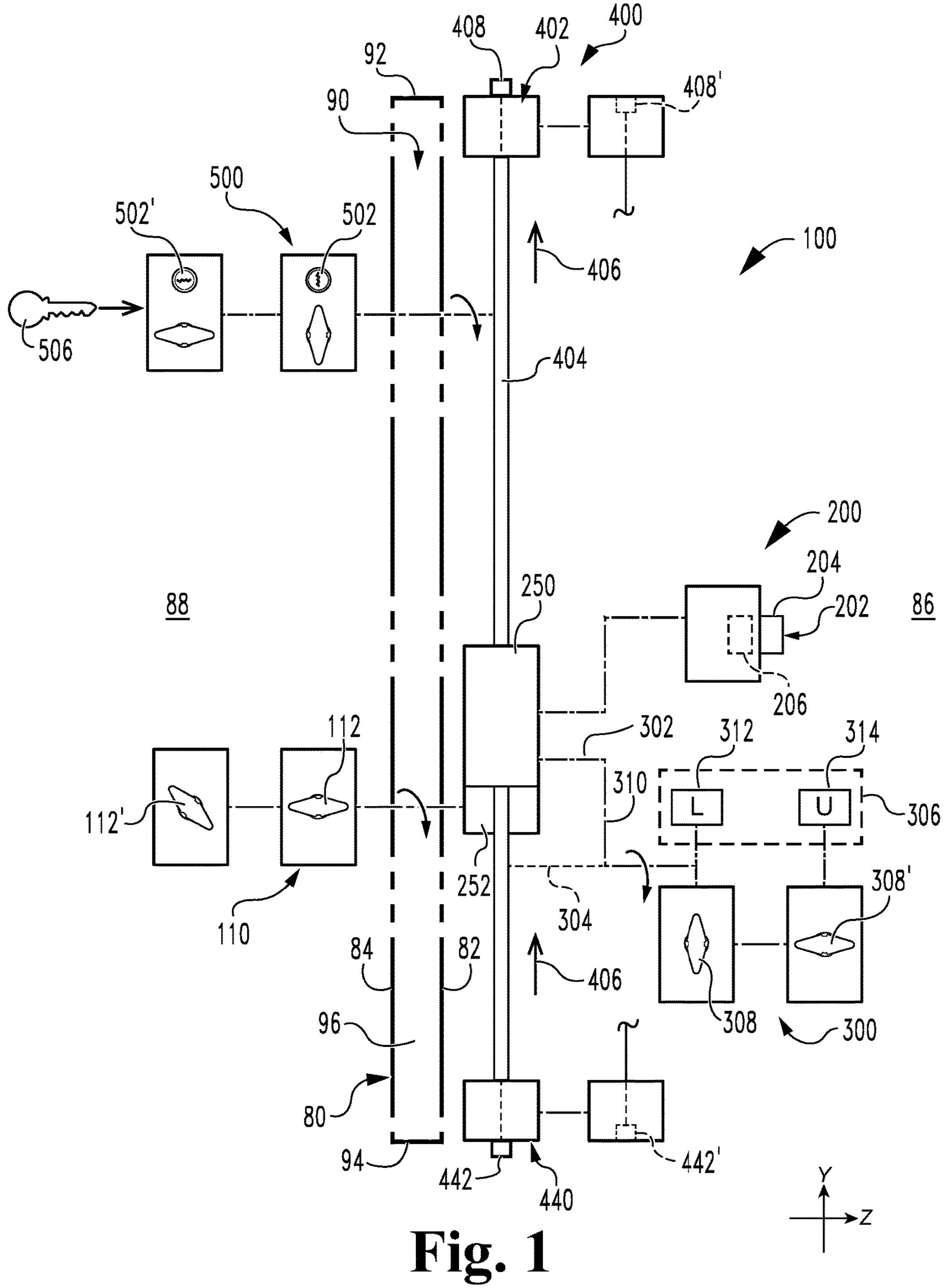
FIG. 1 is a schematic representation of a door and an exit device assembly according to certain embodiments of the present disclosure.
Figure 2:
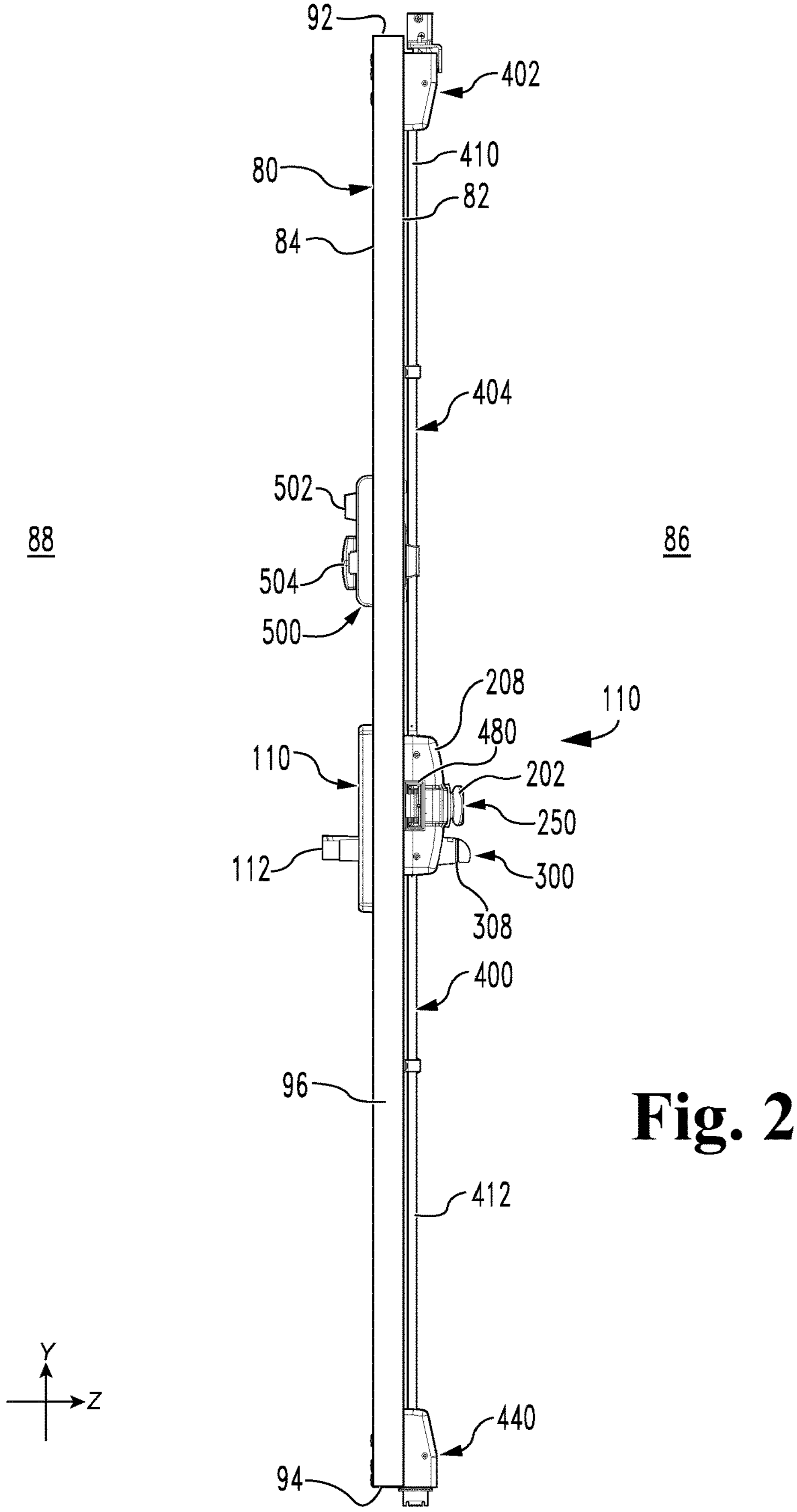
FIG. 2 is a side elevation view of a door and exit device assembly according to a certain embodiment of the present disclosure.
Figure 3:
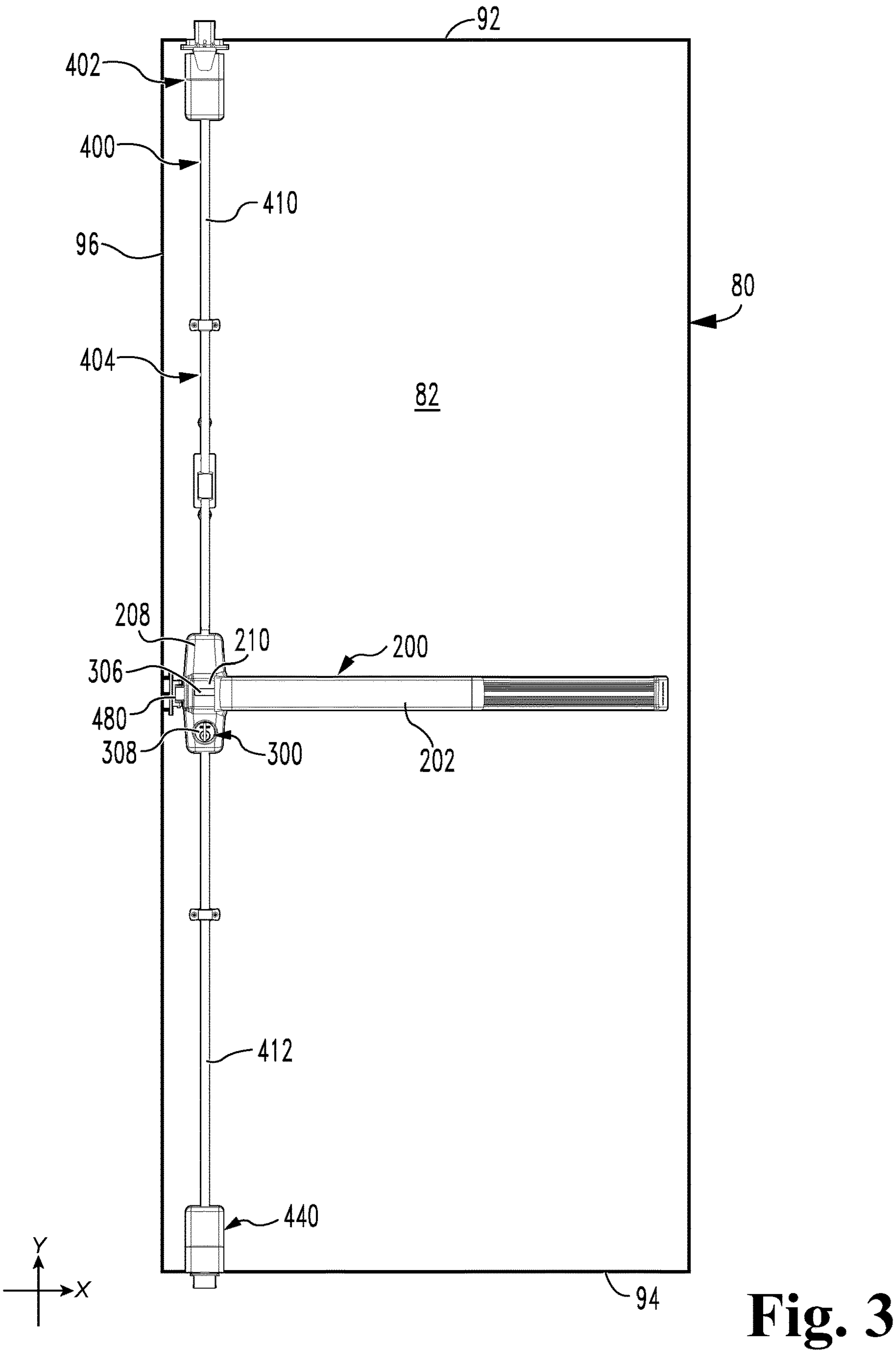
FIG. 3 is an egress side elevation view of the door and exit device assembly of FIG. 2.
Figure 4:
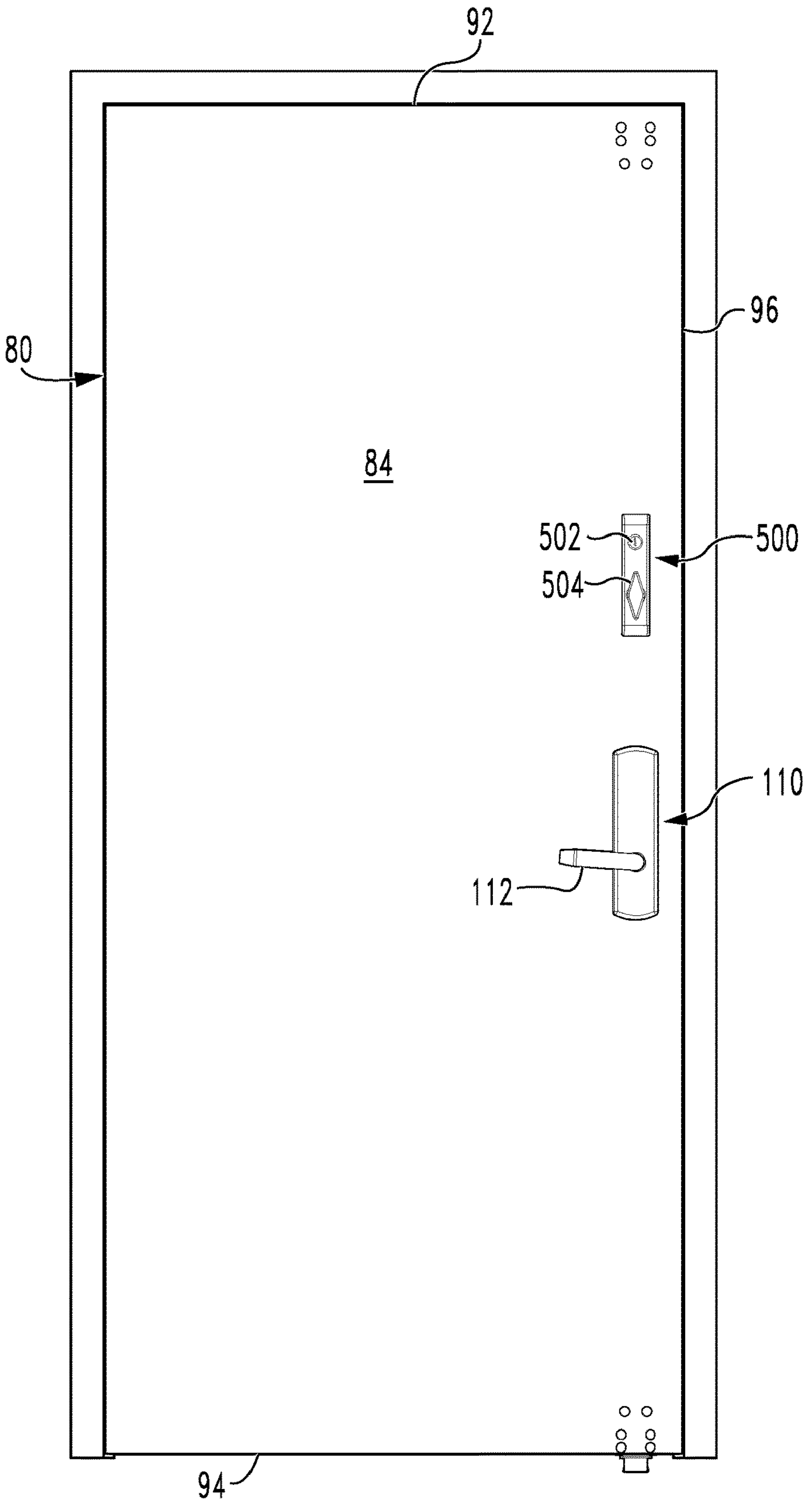
FIG. 4 is an ingress side elevation view of the door and exit device assembly of FIG. 2.
Figure 5:
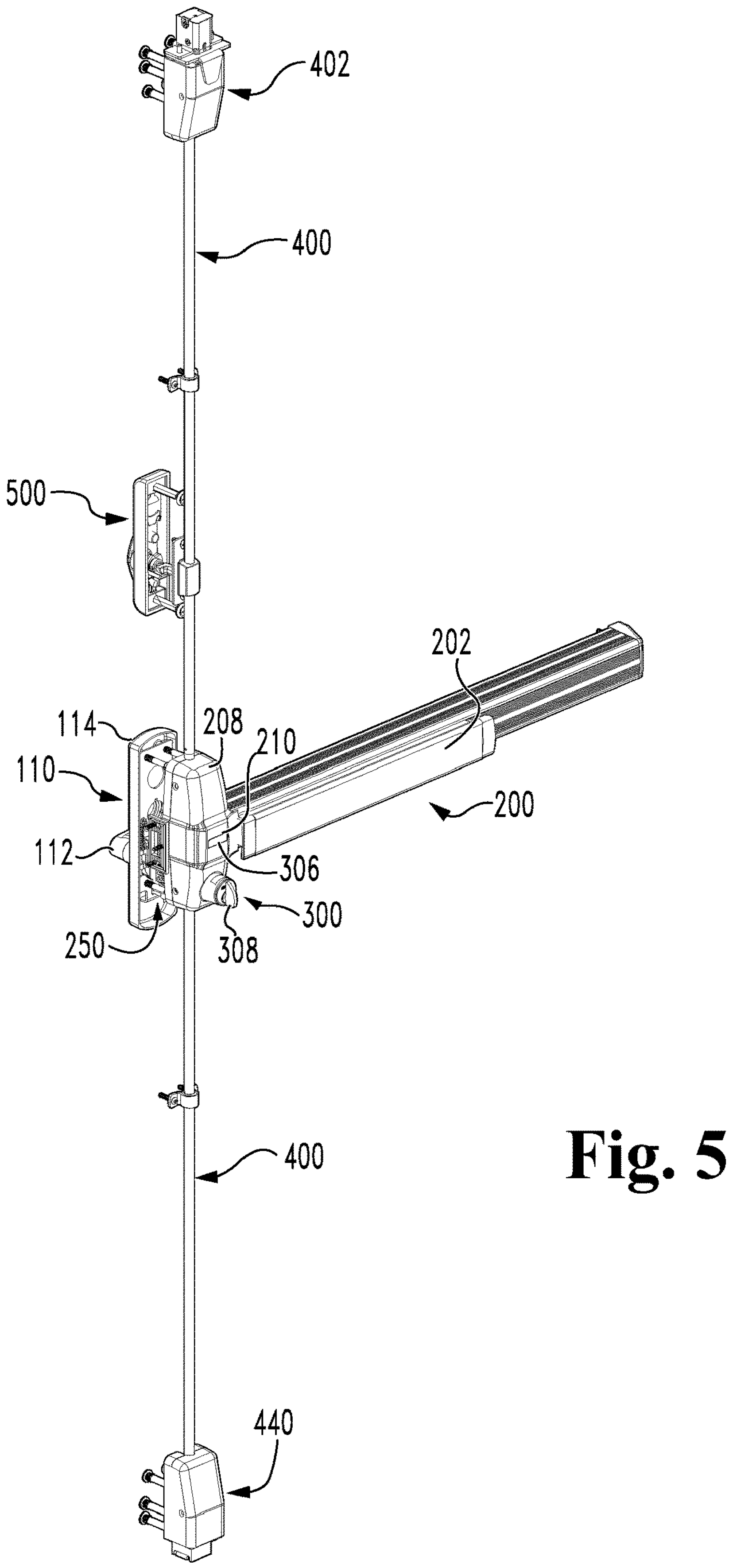
FIG. 5 is a perspective view of the exit device assembly of FIG. 2 with the door removed and looking toward the egress side.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" are used to denote motion or spacing along three mutually perpendicular axes, wherein each of the axes defines two opposite directions. In the coordinate system illustrated in the Figures, the X-axis defines first and second longitudinal directions, the Y-axis defines first and second lateral directions, and the Z-axis defines first and second transverse directions. These terms are used for case and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated schematically therein is a door 80 having installed thereon an access control device in the form of an exit device assembly 100 according to certain embodiments of the present disclosure. The door 80 generally includes an egress side 82 and a non-egress or ingress side 84 opposite the egress side 82. When the door 80 is in its closed position, the non-egress side 84 faces an exterior or outer region 88, and the egress side 82 faces an interior or access-controlled region 86. In an embodiment, the interior or access-controlled region is an auditorium, gymnasium, storm shelter, or other interior location in which the ingress side access control components can be locked and/or made rigid from the egress side of door 80, as discussed further below.

The door 80 also includes an outer perimeter 90 that faces a doorframe when the door 80 is in its closed position. Outer perimeter 90 includes an upper edge 92, a lower edge 94, and an unhinged edge 96 that swings toward the outer region 88 when door 80 is opened. While only one door 80 is shown in the Figures, it should be appreciated that door 80 may be provided as one part of a side-by-side or double door arrangement. If two doors are provided, then the second door can include an exit device assembly 100 according to the present disclosure.

Referring further to FIGS. 2-6, details of an embodiment of the exit device assembly 100 of FIG. 1 are shown. The exit device assembly 100 generally includes a trim 110 installed to the non-egress side 84, a pushbar assembly 200 installed to the egress side 82, and a trim lock device 300 installed to the egress side 82. Pushbar assembly 200 and trim 110 are connected to a latch control mechanism 250. Exit device assembly 100 also includes a remote latch assembly 400 installed on egress side 82 that is connected to latch control mechanism 250, and a key mechanism 500 installed on non-egress side 84 that is connected to remote latch assembly 400.

The illustrated pushbar assembly 200 includes a pushbar 202 operable to actuate the latch control mechanism 250 to operate remote latch assembly 400 so door 80 can be opened. Trim 110 is selectively operable to actuate the latch control mechanism 250 based upon a locked/unlocked state of the trim lock device 300 to operate remote latch assembly 400. Key mechanism 500 is selectively operable to actuate the latch control mechanism 250 through a control rod 404 of remote latch assembly 400 only when a key is inserted into key mechanism 500 and rotated to displace control rod 404 to operate remote latch assembly 400.

Exit device assembly 100 includes pushbar assembly 200 configured for mounting to egress side 82 of door 80.

Pushbar assembly 200 includes pushbar 202 movable between a projected positon 204 and a depressed position 206. Exit device assembly 100 includes trim 110 configured for mounting to non-egress side 84 of the door 80. Trim 110 includes a handle 112 that is operated manually by a user on non-egress side 84. Exit device assembly 100 includes at least one remote latch mechanism 402 as part of remote latch assembly 400 on the egress side 82 of door 80. The at least one remote latch mechanism 402 is configured secure the door 80 in a closed position.

Exit device assembly 100 further includes latch control mechanism 250 mounted to the egress side 82 of door 80. Latch control mechanism 250 is operably connected to the remote latch mechanism 402 with control rod 404. Latch control mechanism 250 is further operably connected to the pushbar 202. Latch control mechanism 250 is also operably connected to the handle 112 with an input mechanism 252. Movement of the pushbar 202 from projected position 204 to depressed position 206 moves the latch control mechanism 250 from a deactuated state in which remote latch mechanism 402 secures the door 80 in the closed position to an actuated state in which the remote latch mechanism 402 is controlled by the latch control mechanism 250 to allow the door 80 to be moved from the closed position.

Exit device assembly 100 includes key mechanism 500 on the non-egress side 84 of the door 80. Key mechanism 500 including a lock cylinder 502 and a manual actuator 504 that is selectively locked and unlocked by manipulation of the lock cylinder 502 with key 506. The manual actuator 504 is connected to the control rod 404. Rotation of the manual actuator 504, as indicated by rotated manual actuator 504, when the lock cylinder 502 is unlocked, as indicated by lock cylinder 502', axially displaces the control rod 404, as indicated by arrows 406, and manipulates the latch control mechanism 250 from the deactuated state to the actuated state.

Exit device assembly 100 also includes trim lock device 300 on the egress side 82 of door 80. Trim lock device 300 is movable by the user between a blocking position 302 in which the trim lock device 300 blocks the input mechanism 252 to prevent the handle 112 of the trim 110 from manipulating the latch control mechanism 250 from the deactuated state to the actuated state, and an unblocking position 304 in which the handle 112 is operable to manipulate the latch control mechanism 250 from the deactuated state to the actuated state, as indicated by pivoted handle 112'.

A method for controlling ingress and egress through door 80 using exit device assembly 100 is also provided. The exit device assembly 100 includes pushbar assembly 200 on egress side 82 of door 80, trim 100 on non-egress side 84 of door 80, at least one remote latch mechanism 402 on the egress side 82 of door 80, latch control mechanism 250 mounted to the door 80 for manipulating the at least one remote latch mechanism 402, key mechanism 500 on the non-egress side 84 of the door 80 separate from the trim 100, and a trim lock device 300 on the egress side 82 of the door 80.

The method includes positioning the trim lock device 300 in the unblocking position 304 to provide ingress through the door 80 via handle 112 on trim 100. Handle 112 is connected to the latch control mechanism 250 with input mechanism 252. Handle 112 is operable to manipulate the latch control mechanism 250 through the input mechanism 252 from a deactuated state in which at least one of remote latch mechanism 402, 440 of remote latch assembly 400 secures the door 80 in the closed position, such as shown by projected/locked upper latch 408, to an actuated state in which the remote latch mechanism 402 is controlled by the latch control mechanism 250 to allow the door 80 to be moved from the closed position, such as shown by retracted/unlocked upper latch 408'.

The method also includes positioning the trim lock device 300 in the blocking position 302 to block the input mechanism 252 and disable ingress through the door 80 via the handle 112 on the trim 110. In the blocking position 302, ingress through the door 80 is only enabled via a key 506 inserted into the key mechanism 500 to unlock a normally locked manual actuator 504 of the key mechanism 500. The manual actuator 504 is connected to the latch control mechanism 250 such that unlocked manual actuator 504 is operable to manipulate the latch control mechanism 250 from the deactuated state to the actuated state.

In an embodiment, pushbar assembly 200 is always enabled to manipulate the latch control mechanism 250 with pushbar 202 from the deactuated state to the actuated state while the trim lock device 300 is in both the blocking position 302 and unblocking position 304. In an embodiment, pushbar assembly 200 is always enabled to manipulate the latch control mechanism 250 with pushbar 202 from the deactuated state to the actuated state while the key mechanism 500 is both locked and unlocked.

In an embodiment, the at least one remote latch mechanism 402, 440 is controlled with the latch control mechanism 250 via control rod 404. The control rod 404 connects the at least one remote latch mechanism 402, 440 to the latch control mechanism 250. In an embodiment, the remote latch mechanism 402, 440 on the egress side 82 of door 80 is part of a remote latch assembly 400 that includes a first remote latch mechanism 402 adjacent upper edge 92 and a second remote latch mechanism 440 adjacent lower edge 94. In an embodiment, a longitudinally movable (X-direction) side edge latch 480 (see FIGS. 2-3) is provided at unhinged edge 96 that is aligned with pushbar 202 and also operated by latch control mechanism 250. In other embodiments, side edge latch 480 is omitted from exit device assembly 100, and latching is only provided by the remote latch assembly 400.

In an embodiment, the manual actuator 504 of key mechanism 500 is connected to the control rod 404. Rotation of the manual actuator 504 axially displaces the control rod 404 to manipulate the latch control mechanism 250 from the deactuated state to the actuated state, which allows retraction of the remote latch mechanisms 402, 440 to open door 80.

In an embodiment, the method includes displaying an indicator 306 on trim lock device 300 that indicates the trim 100 is locked while the trim lock device 300 is in the blocking position 302. In an embodiment, positioning the trim lock device 300 in the blocking position 302 to block the input mechanism 252 includes manually rotating a turn member 308 of the trim lock device 300 to position a lug 310 that blocks movement of the input mechanism 252.

In an embodiment, the key mechanism 500 includes lock cylinder 502 that receive the key 506 to unlock the manual actuator 504. In an embodiment, the key 506 is only removable from the lock cylinder 502 when the lock cylinder 502 is in the home or locked position as indicated by lock cylinder 502 in FIG. 1, and is not removable when the lock cylinder 502 is rotated for unlocking, as indicated by lock cylinder 502'. This prevents exit device assembly 100 from being unintentionally or accidentally placed in an unlocked condition from non-egress side 84.

Additional details relating to the illustrated embodiment of the exit device assembly 100 are further described with reference to FIGS. 2-12. Further examples of one or more components associated with exit device assemblies are provided in, for example, U.S. Pat. Nos. 10,745,942; 10,370,872; 9,945,158; 11,459,798; and U.S. Patent App. Pub. No. 2022/0389740; each of which is incorporated herein by reference in its entirety.

Figure 6:
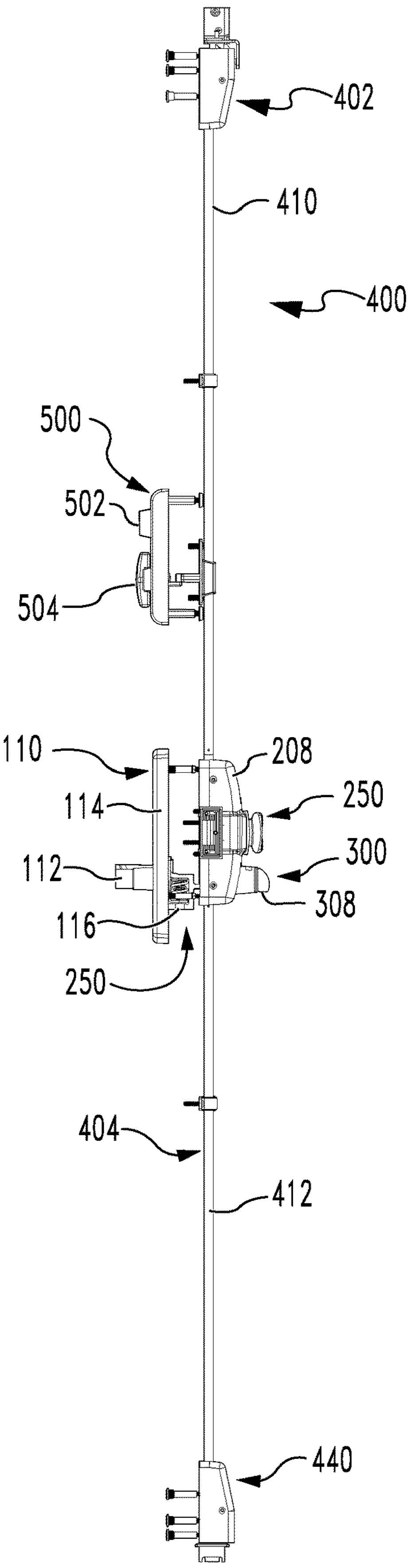
FIG. 6 is a left side elevation view of the exit device assembly of FIG. 5.
Figure 7:
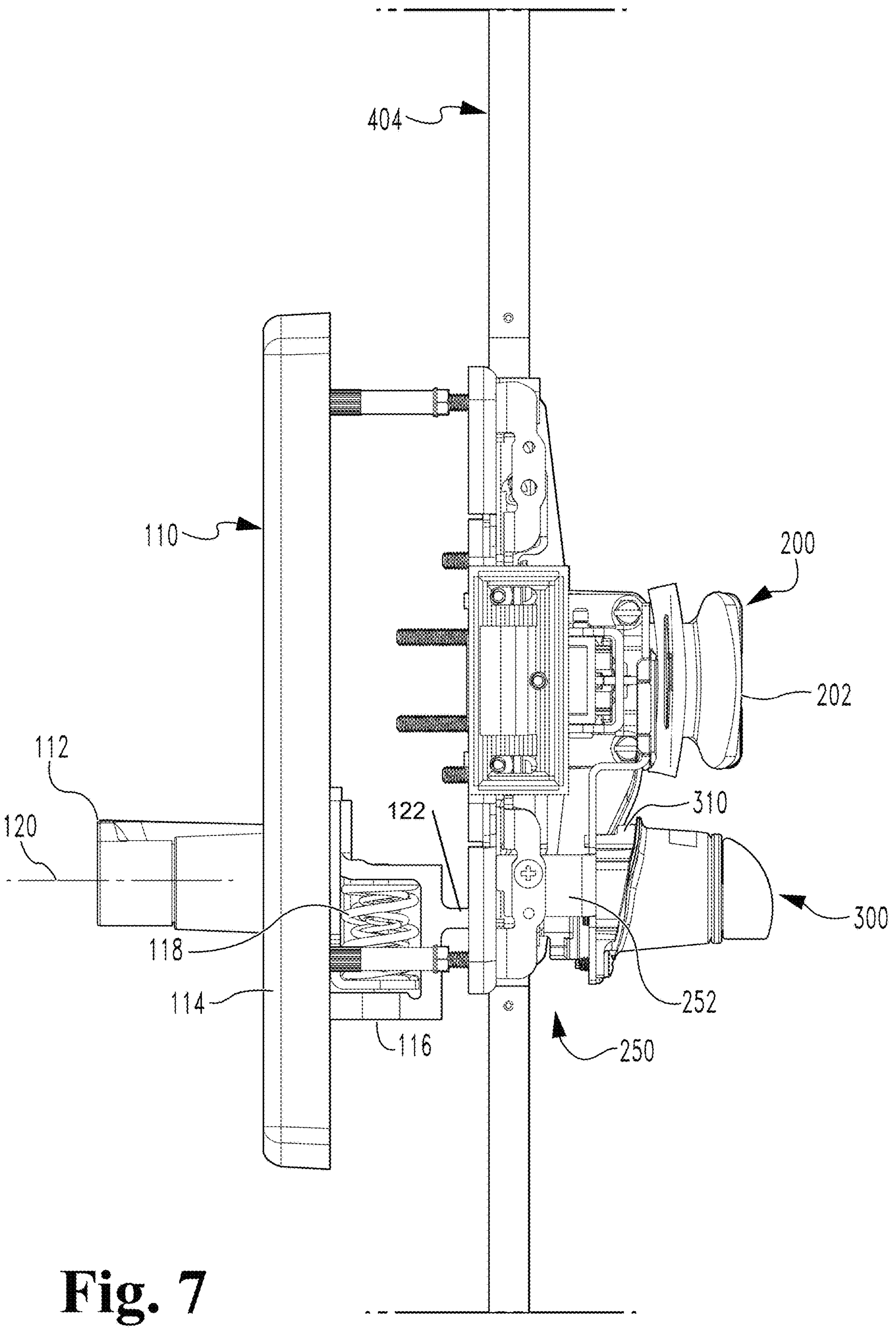
FIG. 7 is an elevation view with the door removed showing certain aspects of the trim, pushbar assembly, latch control mechanism, and trim lock device of the exit device assembly.

Referring to FIGS. 6-7, trim 110 generally includes an escutcheon 114, manual actuator or handle 112 rotatably mounted to the escutcheon 110, and a lift finger assembly 116 engaged with the manual actuator 112 via a cam or other motion transmitting arrangement such that rotation of the handle 112 lifts or causes vertical displacement of the lift finger assembly 116. The lift finger assembly 116 extends through the door 80 and is engaged with the latch control mechanism 250 via input mechanism 252 such that rotation of the handle 112 selectively actuates the latch control mechanism 250.

The escutcheon 114 is mounted to the non-egress side 84 of the door 80, and includes a chamber in which various working components of the trim 100 are seated. While other forms for handle 112 are also contemplated, in the illustrated embodiment, the deactuated position is a horizontal orientation of handle 112 in the longitudinal direction, and the actuated position is a pivoted orientation obliquely oriented to the longitudinal direction (X-axis) such that the lift finger assembly 116 is lifted from a deactuated position to an actuated position.

The escutcheon 110 may further include a springs or other bias member(s) (not shown) urging the lift finger assembly 116 toward its deactuated position. Springs 118 may also be provided for a “break-away” function”. The bias member(s) located within escutcheon 110 may be provided in the form of one or more compression springs. In other embodiments, the bias member(s) may include additional or alternative biasing features, such as one or more torsion springs, extension springs, elastic members, and/or magnets.

The handle 112 is pivotably mounted to the escutcheon 110, and is operable to laterally drive (e.g. vertically along Y-axis) the lift finger assembly 116 between its deactuated position and its actuated position. While the illustrated handle 112 is provided in the form of a lever that rotates about the transverse axis 120 in order to lift the lift finger assembly 116, it is to be appreciated that other forms are contemplated. For example, in certain embodiments, the handle 112 may be provided as a knob that rotates about the transverse axis 120 in order to vertically translation the lift finger assembly 116. In other forms, the handle 112 may be provided in the form of a thumb lever that pivots about a longitudinal axis in order to vertically translate the lift finger assembly 116. Such a thumb lever may be engaged with the lift finger assembly 116 via a cam, or via other motion translating mechanisms or arrangements.

In the illustrated embodiment, the lift finger assembly 116 includes at least one finger 122 extending through door 80 to engage input mechanism 252 of latch control assembly 250. Rotation of the handle 112 drives the lift finger assembly 116 upward against the force of the bias member(s) in escutcheon 110, and the upward motion is transmitted to the finger 122. When trim lock device 300 is in an unlocked position, the upward motion of finger 122 translates the input mechanism 252 to actuate latch control assembly 250, which drives control rod 404 in the lateral direction (Y-axis) to unlatch upper and lower remote latch mechanisms 402, 440.

In the event that the input mechanism 252 is blocked by lug 310 of trim lock device 300, then rotation of handle 112 is prevented, or substantially prevented, since finger 122 cannot displace input mechanism 252. Therefore, trim 100 is configured or placed into a rigid state since door 80 cannot be opened by handle 112. In the illustrated embodiment, trim 100 is blank and does not include any lock cylinder that allows handle 112 to be removed from this rigid state by manipulating trim 100. Therefore, when input mechanism 252 is blocked from trim lock device 300, trim 100 is hardened and placed in a rigid state so that door 80 cannot be accidentally opened by debris and the like during a storm event.

The trim lock device 300 includes turn member 308, and lug 310 is engaged to the turn member 308. Turn member 308 can be a thumbturn that is manually grasped on the egress side 82 and turned to rotate lug 310 to selectively place trim 100 in a rigid or locked state, and non-rigid or unlocked state. In the locked or rigid state, the lug 310 is placed in a blocking position and positioned to block movement of the input mechanism 252 by the handle 112. In the unlocked or non-rigid state, the lug 310 is rotated to a position that does not interfere with movement of the input mechanism 252 by the handle 112.

In an embodiment, the trim lock device 300 includes indicator 306 that is also connected to the turn member 308. The indicator 306 including a first indicium 312 corresponding to the locked or blocking position and a second indicium 314 corresponding to the unlocked or unblocking position (FIG. 1.) The center case 208 of pushbar assembly 200 may include a window 210 or other means for viewing indicia 312, 314. Other embodiments contemplate locking/unlocking indicia can be provided on pushbar 202, door 80, or other suitable location.

The first indicium 312 may, for example, include one or more of a color (e.g., white), a word (e.g., “OPEN” or “UNLOCKED”), and/or an icon (e.g., a padlock with an open shackle). The second indicium 314 may likewise include one or more of a color (e.g., red), a word (e.g., “LOCKED”), and/or an icon (e.g., a padlock with a closed shackle).

Figure 8:
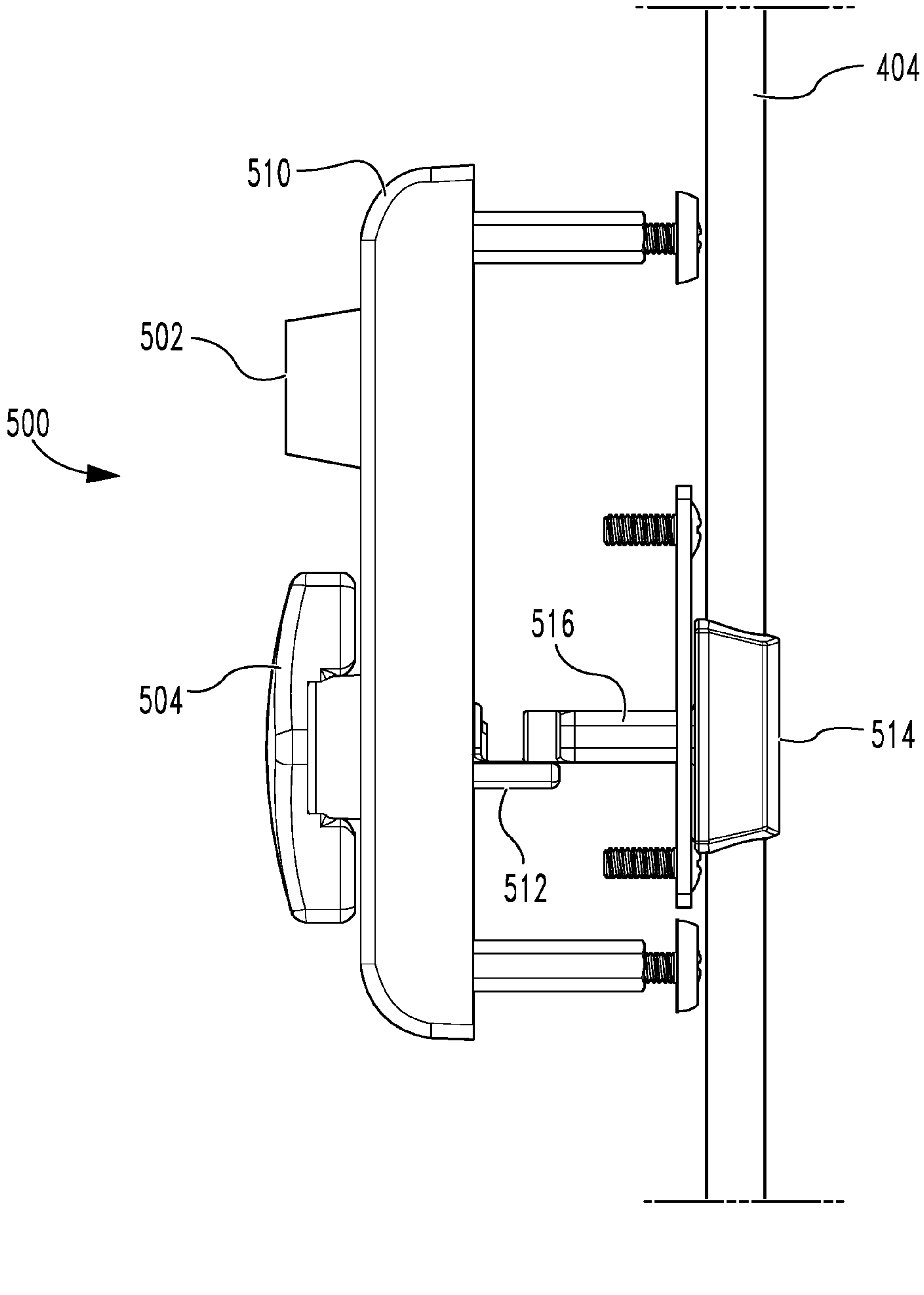
FIG. 8 is an elevation view with the door removed of the key mechanism on the ingress side engaged to a control rod of the remote latch mechanism on the egress side.
Figure 9:
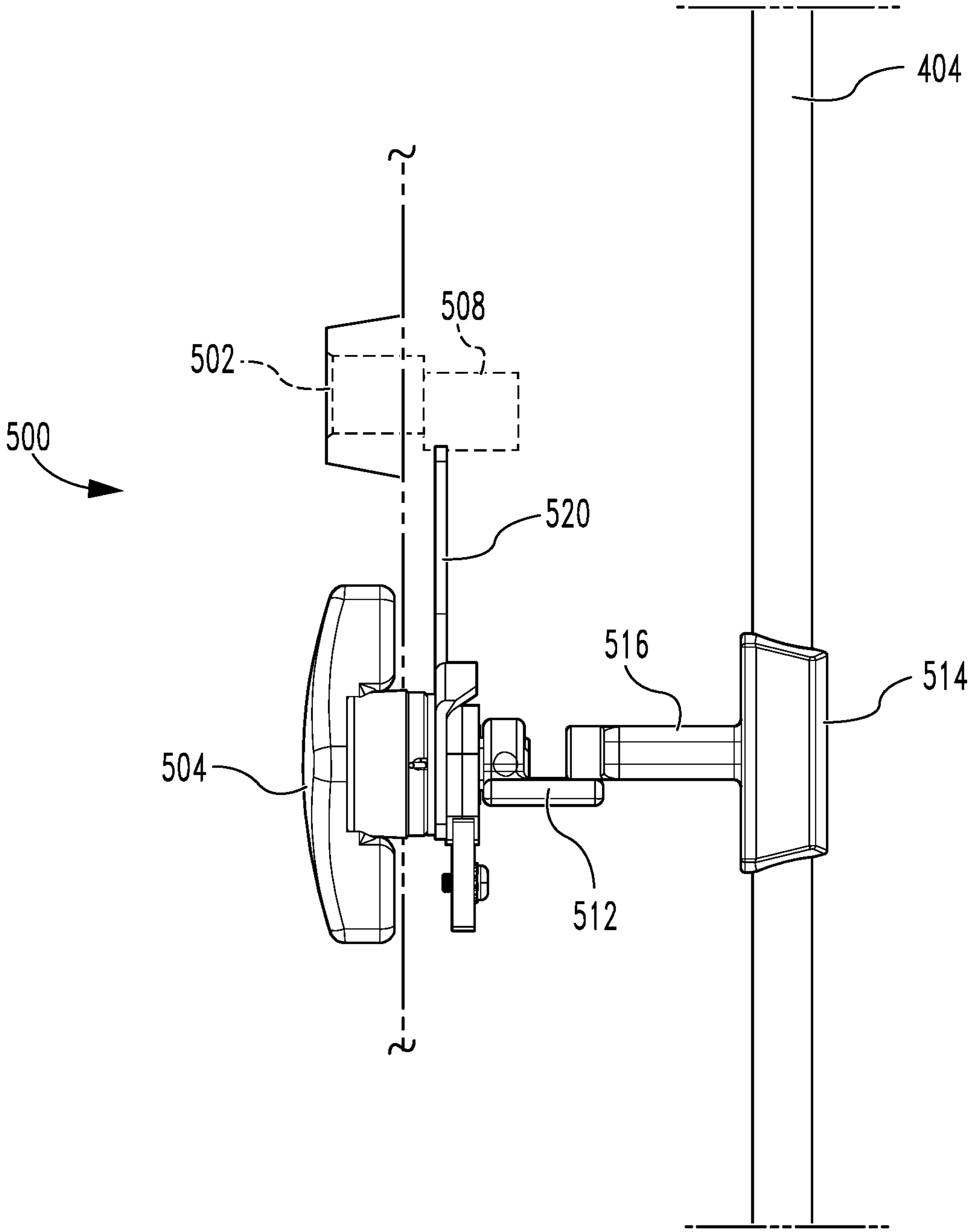
FIG. 9 is another elevation of the key mechanism and control rod of FIG. 8 with the housing of the key mechanism removed.

Referring to FIGS. 8-9, further details of an embodiment of key mechanism 500 is shown. Key mechanism 500 includes lock cylinder 502 that is operable to selectively lock and unlock manual actuator 504 with key 506. The lock cylinder 502 and manual actuator 504 are mounted to the key mechanism escutcheon 510. As is typical of lock cylinders, the lock cylinder 502 includes a shell, a plug rotatably mounted in the shell, a tumbler system operable to selectively prevent rotation of the plug relative to the shell. A tailpiece 508 is engaged with the plug such that, upon insertion of a proper key 506, the key can be rotated to rotate the plug, thereby rotating the tailpiece 508. Such rotation may, for example, enable rotation of manual actuator 504.

In an embodiment, tailpiece 508 is connected to a locking arm 520 that is coupled to manual actuator 504. In the locked position of lock cylinder 502, tailpiece 508 blocks locking arm 520 to prevent manual actuator from being rotated. In the unlocked position, tailpiece 508 is displaced so that locking arm 520 is not blocked, and manual actuator 504 can be rotated to displace control rod 404.

In an embodiment, lock cylinder 502 operates as a keeper cylinder such that key 506 cannot be removed from lock cylinder 502 unless lock cylinder 502 is returned to a home or locking position. In an embodiment, lock cylinder 502 and manual actuator 504 operate as a night latch, such that lock cylinder 502 must be turned and held in an unlocking position in order to manipulate manual actuator 504. Therefore, manual actuator 504 is always in a locked or “rigid” state and cannot be rotated to an unlocked position unless key 506 is inserted into lock cylinder 502 and lock cylinder

502 is rotated to an unlocked position. In a further embodiment, lock cylinder 502 is biased to return to the locked or home position, and therefore must be manually held in the unlocked position with the key 506 in order to manipulate manual actuator 504.

Key mechanism 500 is connected to control rod 404 through door 80. In an embodiment, manual actuator 504 includes a tail 512 extending from escutcheon 510 toward door 80. Control rod 404 includes a sleeve 514 fixedly coupled thereto. Sleeve 514 includes an arm 516 extending into or through door 80. A lower or bottom side of arm 516 is engaged to tail 512 of manual actuator 504. Rotation of manual actuator 504 rotates tail 512, which in turn lifts arm 516 vertically in the lateral (Y-axis) direction. As a result sleeve 514 is translated laterally in the vertical direction, which vertically translates rod 404 in order to actuate latch control mechanism 250 from the deactuated state. As result, the upper and lower remote latch mechanisms 402, 440 are no longer controlled to secure the door in the closed position, and the door 80 can be moved from the closed position to an open position.

Figure 10:
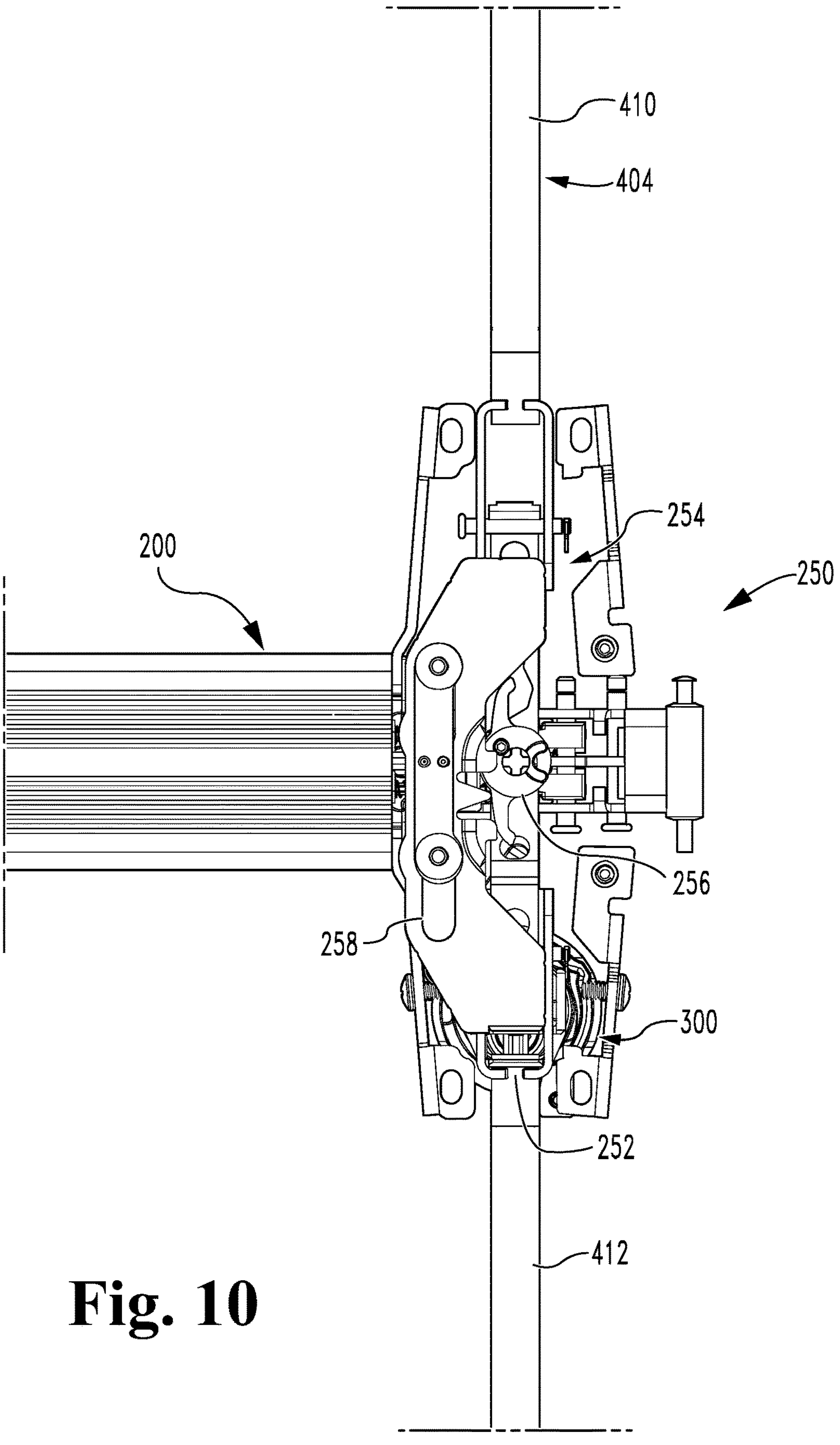
FIG. 10 is an ingress side elevation view of certain aspects of the trim, pushbar assembly, latch control mechanism, and trim lock device of the exit device assembly with the door removed.

Referring to FIG. 10, further details of an embodiment for the connection of control rod 404 with latch control mechanism 250 is shown. In the illustrated embodiment, control rod 404 includes an upper rod portion 410 connected to upper remote latch mechanism 402, and a lower rod portion 412 connected to lower remote latch mechanism 440. The adjacent ends of rod portions 410, 412 are connected to one another with a bracket assembly 254 that extends through latch control mechanism 250. Bracket assembly 254 is engaged to input mechanism 252 associated with trim 100. Bracket assembly 254 is also operably engaged to pushbar assembly 250 with pushbar input 256 at a separate location from engagement of bracket assembly 254 with input mechanism 252.

Pushbar 202 is operably linked to pushbar input 256 such that when pushbar 202 is depressed, pushbar input 256 is caused to rotate, which actuates latch control mechanism 250. Rotation of pushbar input 256 is converted into linear motion of bracket assembly 254, which causes bracket assembly 254 to be laterally displaced along mounting plate 258. This in turn causes rod portions 410, 412 to laterally translate in a vertical direction and manipulates latch mechanisms 402, 440 to allow door 80 to be opened.

Handle 112 is operably engaged to bracket assembly 254 through input mechanism 252. When trim lock device 300 is in the unblocking position, rotation of handle 112 causes finger 122 to vertically displace input mechanism 252. Input mechanism 252 is engaged to a bottom-facing edge or surface of bracket assembly 254 adjacent to the connection of the lower rod portion 412 to bracket assembly 254. The vertical displacement of input mechanism 252 caused by handle 112 vertically lifts bracket assembly 254, which in turn causes rod portions 410, 412 to laterally translate in a vertical direction to manipulate latch mechanisms 402, 440 to allow door 80 to be opened.

When trim lock device 300 is in the blocking position, input mechanism 252 is blocked from vertical movement and handle 112 cannot be used to lift bracket assembly 254 to actuate latch control mechanism 250. However, since pushbar input 256 is located above input mechanism 252 and is not connected to handle 112 or input mechanism 252, pushbar input 256 remains operable to vertically displace bracket assembly 254 to allow remote latch mechanisms 402, 440 to be manipulated by pushbar 202 to provide for egress through the door 80 from interior 86.

Figure 11:
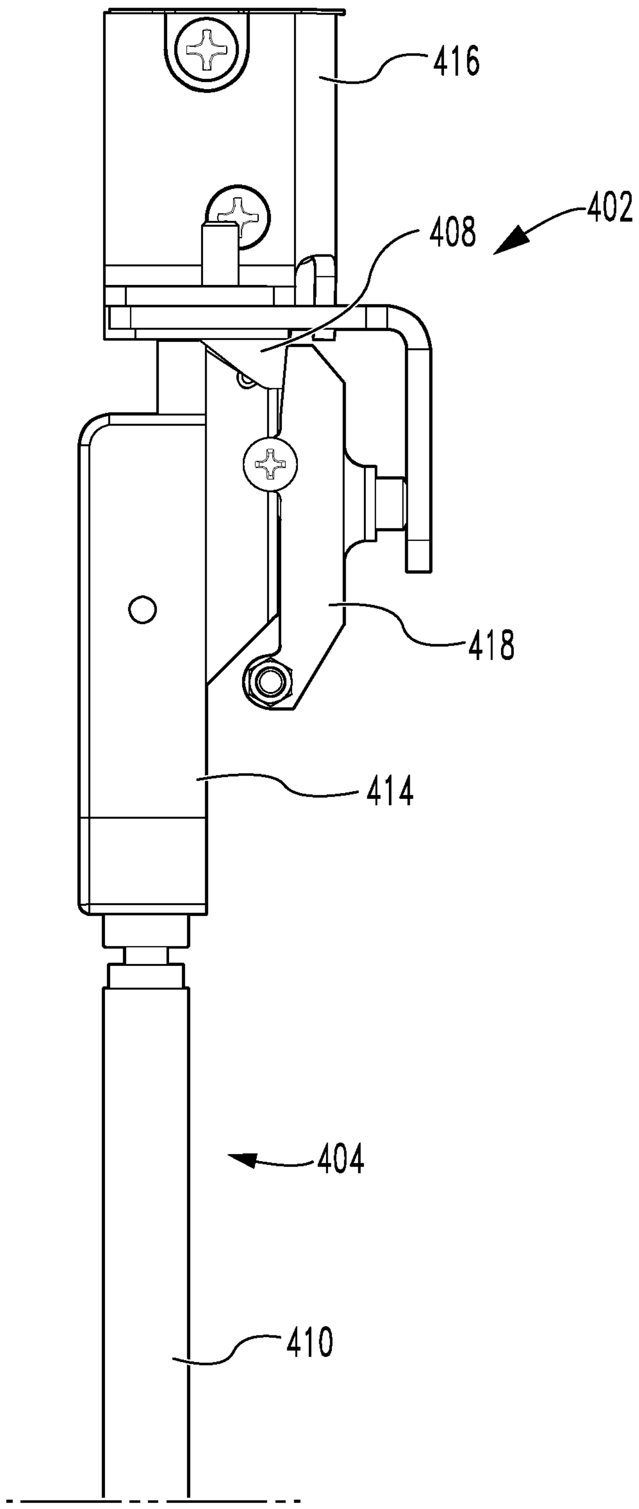
FIG. 11 is a perspective view of certain aspects of the upper remote latch mechanism.

Referring to FIG. 11, further aspects of upper remote latch mechanism 402 are shown. Upper rod portion 410 is engaged to a delatcher 414 that is mounted on egress side 82 of door 80. Upper remote latch mechanism 402 further includes a rigid lock member 418 engaged to door 80 and extending along the egress side of delatcher 414. Delatcher 414 is also engaged to an upper latch 408 in upper latch housing 416. Upper latch housing 416 may be engaged to the door frame or wall around the door opening.

Upper latch 408 is normally projected downwardly to block lock member 418 and prevent door 80 from opening while latch control mechanism 250 is deactuated. As rod portion 410 is vertically displaced due to actuation of latch control mechanism 250, delatcher 414 is vertically displaced to displace or unlock upper latch 408 so it does not block or prevent movement of lock member 418. As a result, lock member 418 is no longer interfered with by upper latch 408 in a manner that prevents 80 from opening.

Figure 12:
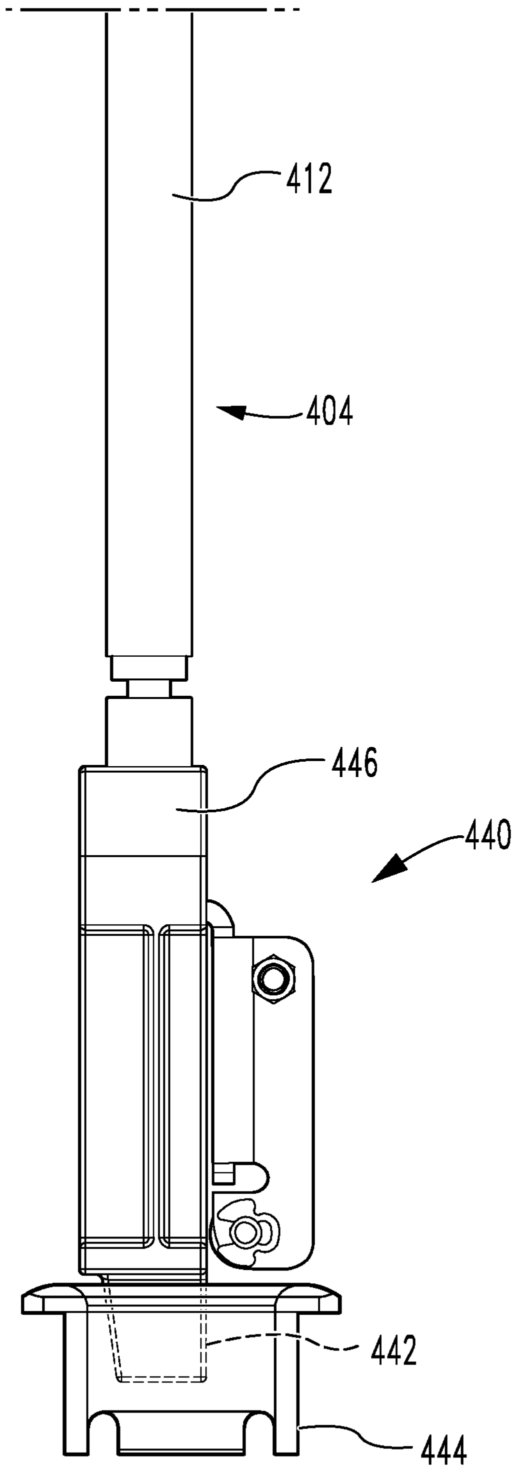
FIG. 12 is a perspective view of certain aspects of the lower remote latch mechanism.

Referring to FIG. 12, further aspects of lower remote latch mechanism 440 are shown. Lower rod portion 412 is engaged to a delatcher 446 that is mounted on egress side 82 of door 80. Lower remote latch mechanism 440 further includes a latch member 442 that is normally received in lower latch housing 444 when latch control mechanism 250 is unactuated. Lower latch housing 444 may be engaged to the door frame or wall around the door opening, and configured to interact with lower latch 442 to prevent door 80 from being opened unless latch control mechanism 250 is actuated. As rod portion 412 is vertically displaced due to actuation of latch control mechanism 250, delatcher 446 displaces or unlocks lower latch member 442 so it is not blocked by lower latch housing 444 in a manner that prevents door 80 from opening.

In certain embodiments, remote latch assembly 400 may be provided as a concealed vertical exit device, in which the connectors run through channels formed within the door 80. In other embodiments, remote latch assembly 400 is provided as shown, in which the connectors are mounted exteriorly to the egress side 82 of the door 80. In other embodiments, a side edge latch 480 is provided that is locked and unlocked in conjunction with the locking and unlocking of remote latch assembly 400.

According to one aspect of the present disclosure, an exit device assembly configured for mounting to a door to provided. The exit device assembly includes a pushbar assembly configured for mounting to an egress side of the door. The pushbar assembly includes a pushbar movable between a projected positon and a depressed position. The exit device assembly includes a trim configured for mounting to a non-egress side of the door, the trim including a handle, and at least one remote latch mechanism for mounting on the egress side of the door configured lock the door in a closed position. The exit device assembly also includes a latch control mechanism mounted to the door. The latch control mechanism is operably connected to the at least one remote latch mechanism with a control rod. The latch control mechanism is further operably connected to the pushbar and operably connected to the handle with an input mechanism. Movement of the pushbar from a projected position to a depressed position moves the latch control mechanism from a deactuated state in which remote latch mechanism secures the door in the closed position to an actuated state in which the remote latch mechanism is controlled by the latch control mechanism to allow the door to be moved from the closed position. The exit device assembly also includes a key mechanism on the non-egress side of the door. The key mechanism includes a lock cylinder and a manual actuator that is selectively locked and unlocked by manipulation of the lock cylinder. The manual actuator is connected to the control rod and rotation of the manual actuator when the key cylinder is unlocked axially displaces the control rod and manipulates the latch control mechanism from the deactuated state to the actuated state. The exit device assembly further includes a trim lock device on the egress side of the door. The trim lock device is movable by a user on the egress side between a blocking position in which the trim lock device blocks the input mechanism to prevent the handle of the trim from manipulating the latch control mechanism from the deactuated state to the actuated state, and an unblocking position in which the handle of the trim is operable to manipulate the latch control mechanism from the deactuated state to the actuated state.

In an embodiment, the trim includes a blank escutcheon and the handle is not lockable with the trim.

In an embodiment, the trim lock device includes a turn member and a lug engaged to the turn member. In the blocking position the lug is positioned to block movement of the input mechanism by the handle of the trim. In a further embodiment, the trim lock device includes an indicator connected to the turn member. The indicator includes a first indicium corresponding to the blocking position and a second indicium corresponding to the unblocking position. In another further embodiment, the turn member is a thumbturn that is manually rotated by the user between the blocking position and the unblocking position.

In an embodiment, the at least one remote latch mechanism includes a first remote latch mechanism and a second remote latch mechanism. The first remote latch mechanism is position at an upper edge of the door and the second remote latch mechanism is connected positioned at a lower edge of the door, and the control rod connects the first remote latch mechanism and the second remote latch mechanism with the latch control mechanism. In a further embodiment, rotation of the manual actuator of the key mechanism to axially displace the control rod moves the latch control mechanism from the deactuated state in which each of the first and second remote latch mechanisms locks the door in the closed position to the actuated state in which each of the first and second remote latch mechanisms is controlled by the latch control mechanism via the control rod to allow the door to be moved from the closed position.

In an embodiment, the exit device assembly includes a sleeve engaged to the control rod, an arm extending from the sleeve into the door, and the manual actuator of the key mechanism is engaged to the arm such that rotation of the manual actuator lifts the arm, which in turn lifts the sleeve engaged to the control rod to axially displace the control rod and move the latch control mechanism from the deactuated state to the actuated state.

In an embodiment, the handle of the trim is rigid while the trim lock device is in the blocking position, and the handle of the trim is always unlocked when the trim lock device is in the unblocking position. In a further embodiment, the manual actuator of the key mechanism is always rigid unless the manual actuator is unlocked with a key in the key cylinder. In yet a further embodiment, the key cylinder is a keeper cylinder that traps the key inserted therein while the keeper cylinder is rotated to unlock the manual actuator.

According to another aspect of the present disclosure, a method for controlling ingress and egress through a door is provided. The door includes an exit device assembly, the exit device assembly including a pushbar assembly mounted to an egress side of the door, a trim mounted to a non-egress side of the door, at least one remote latch mechanism mounted on the egress side of the door, a latch control mechanism mounted to the door for manipulating the at least one remote latch mechanism, a key mechanism mounted on the non-egress side of the door separate from the trim, and a trim lock device on the egress side of the door. The method includes positioning the trim lock device in an unblocking position to provide ingress through the door via a handle on the trim, wherein the handle is connected to the latch control mechanism with an input mechanism, and the handle is operable to manipulate the latch control mechanism through the input mechanism from a deactuated state in which remote latch mechanism secures the door in the closed position to an actuated state in which the remote latch mechanism is controlled by the latch control mechanism to allow the door to be moved from the closed position; positioning the trim lock device in a blocking position to block the input mechanism and disable ingress through the door via the handle on the trim, wherein in the blocking position ingress through the door is only enabled via a key inserted into the key mechanism to unlock a normally locked manual actuator of the key mechanism, the manual actuator being connected to the latch control mechanism such that the unlocked manual actuator is operable to manipulate the latch control mechanism from the deactuated state to the actuated state while the trim lock device is in the blocking position; and wherein the pushbar assembly is always enabled to manipulate the latch control mechanism from the deactuated state to the actuated state while the trim lock device is in both the blocking position and the unblocking position.

In an embodiment of the method, the pushbar assembly is always enabled to manipulate the latch control mechanism from the deactuated state to the actuated state while the key mechanism is both locked and unlocked.

In an embodiment, the method includes controlling the remote latch mechanism with the latch control mechanism via a control rod, the control rod connecting the remote latch mechanism to the latch control mechanism. In a further embodiment, the manual actuator of the key mechanism is connected to the control rod. In yet a further embodiment, rotation of the manual actuator axially displaces the control rod manipulate the latch control mechanism from the deactuated state to the actuated state.

In an embodiment, the method includes displaying an indicator that the trim is locked while the trim lock device is in the blocking position.

In an embodiment of the method, positioning the trim lock device in the blocking position to block the input mechanism includes manually rotating a turn member of the trim lock device to position a lug that blocks movement of the input mechanism.

In an embodiment, the key mechanism includes a lock cylinder that receive the key to unlock the manual actuator, and the key is only removable from the lock cylinder when the lock cylinder is in the locked position.

In an embodiment of the method, the at least one remote latch mechanism on the egress side of the door includes a first remote latch mechanism positioned at an upper edge of the door, a second remote latch mechanism positioned at a lower edge of the door, the first remote latch mechanism is connected to an upper control rod portion, the second remote latch mechanism is connected to a lower control rod portion, the upper and lower control rod portions are connected to one another with a bracket assembly, and the latch control mechanism is connected to the bracket assembly to simultaneously displace the upper and lower control rod portions to manipulate the first and second remote latch mechanisms when the latch control mechanism is manipulated from the deactuated state to the actuated state.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An exit device assembly configured for mounting to a door, the exit device assembly comprising:

a pushbar assembly configured for mounting to an egress side of the door, the pushbar assembly including a pushbar movable between a projected positon and a depressed position;

a trim configured for mounting to a non-egress side of the door, the trim including a handle;

at least one remote latch mechanism for mounting on the egress side of the door and configured lock the door in a closed position;

a latch control mechanism mounted to the door, the latch control mechanism being operably connected to the at least one remote latch mechanism with a control rod, the latch control mechanism further being operably connected to the pushbar, the latch control mechanism further being operably connected to the handle with an input mechanism, wherein movement of the pushbar from the projected position to the depressed position moves the latch control mechanism from a deactuated state, in which remote latch mechanism locks the door in the closed position, to an actuated state, in which the at least one remote latch mechanism is controlled by the latch control mechanism to allow the door to be moved from the closed position;

a sleeve engaged to the control rod;

an arm extending from the sleeve into the door;

a key mechanism on the non-egress side of the door, the key mechanism including a lock cylinder and a manual actuator that is selectively locked and unlocked by manipulation of the lock cylinder, wherein the manual actuator is connected to the control rod and rotation of the manual actuator, when the key cylinder is unlocked, axially displaces the control rod and manipulates the latch control mechanism from the deactuated state to the actuated state, wherein the manual actuator of the key mechanism is engaged to the arm such that rotation of the manual actuator lifts the arm, which in turn lifts the sleeve engaged to the control rod to axially displace the control rod and move the latch control mechanism from the deactuated state to the actuated state; and a trim lock device on the egress side of the door, the trim lock device being movable by a user on the egress side between a blocking position, in which the trim lock device blocks the input mechanism to prevent the handle of the trim from manipulating the latch control mechanism from the deactuated state to the actuated state, and an unblocking position, in which the handle of the trim is operable to manipulate the latch control mechanism from the deactuated state to the actuated state.

2. The exit device assembly of claim 1, wherein the trim includes a blank escutcheon and the handle is not lockable with the trim.

3. The exit device assembly of claim 1, wherein the trim lock device includes a turn member and a lug engaged to the turn member, wherein in the blocking position, the lug is positioned to block movement of the input mechanism by the handle of the trim.

4. The exit device assembly of claim 3, wherein the trim lock device includes an indicator connected to the turn member, the indicator including a first indicium corresponding to the blocking position and a second indicium corresponding to the unblocking position.

5. The exit device assembly of claim 3, wherein the turn member is a thumbturn that is manually rotated by the user between the blocking position and the unblocking position.

6. The exit device assembly of claim 1, wherein the at least one remote latch mechanism includes a first remote latch mechanism and a second remote latch mechanism, wherein the first remote latch mechanism is positioned at an upper edge of the door and the second remote latch mechanism is positioned at a lower edge of the door, and the control rod connects the first remote latch mechanism and the second remote latch mechanism with the latch control mechanism.

7. The exit device assembly of claim 6, wherein rotation of the manual actuator of the key mechanism to axially displace the control rod moves the latch control mechanism from the deactuated state, in which each of the first and second remote latch mechanisms locks the door in the closed position, to the actuated state, in which each of the first and second remote latch mechanisms is controlled by the latch control mechanism via the control rod to allow the door to be moved from the closed position.

8. The exit device assembly of claim 1, wherein the handle of the trim cannot be rotated to an unlocked position while the trim lock device is in the blocking position, and the handle of the trim is always unlocked when the trim lock device is in the unblocking position.

9. The exit device assembly of claim 8, wherein the manual actuator of the key mechanism is always unable to be rotated to the unlocked position unless the manual actuator is unlocked with a key in the key cylinder.

10. The exit device assembly of claim 9, wherein the key cylinder is a keeper cylinder that traps the key inserted therein while the keeper cylinder is rotated to unlock the manual actuator.

11. A method for controlling ingress and egress through a door, the door including an exit device assembly, the exit device assembly including a pushbar assembly mounted to an egress side of the door, a trim mounted to a non-egress side of the door, at least one remote latch mechanism mounted on the egress side of the door, a latch control mechanism mounted to the door for manipulating the at least one remote latch mechanism, a key mechanism mounted on the non-egress side of the door separate from the trim, and a trim lock device on the egress side of the door, the method comprising:

positioning the trim lock device in an unblocking position to provide ingress through the door via a handle on the trim, wherein the handle is connected to the latch control mechanism with an input mechanism, and the handle is operable to manipulate the latch control mechanism through the input mechanism from a deactuated state, in which the at least one remote latch mechanism secures the door in the closed position, to an actuated state, in which the at least one remote latch mechanism is controlled by the latch control mechanism to allow the door to be moved from the closed position;

positioning the trim lock device in a blocking position to block the input mechanism and disable ingress through the door via the handle on the trim, wherein in the blocking position, ingress through the door is only enabled via a key inserted into the key mechanism to unlock a normally locked manual actuator of the key mechanism, the manual actuator being connected to the latch control mechanism such that the unlocked manual actuator is operable to manipulate the latch control mechanism from the deactuated state to the actuated state while the trim lock device is in the blocking position, wherein the pushbar assembly is always enabled to manipulate the latch control mechanism from the deactuated state to the actuated state while the trim lock device is in both the blocking position and the unblocking position; and controlling the at least one remote latch mechanism with the latch control mechanism via a control rod, the control rod connecting the at least one remote latch mechanism, wherein the manual actuator of the key mechanism is connected to the control rod and rotation of the manual actuator axially displaces the control rod to manipulate the latch control mechanism from the deactuated state to the actuated state.

12. The method of claim 11, wherein the pushbar assembly is always enabled to manipulate the latch control mechanism from the deactuated state to the actuated state while the key mechanism is both locked and unlocked.

13. The method of claim 11, further comprising displaying an indicator that the trim is locked while the trim lock device is in the blocking position.

14. The method of claim 11, wherein positioning the trim lock device in the blocking position to block the input mechanism includes manually rotating a turn member of the trim lock device to position a lug that blocks movement of the input mechanism.

15. The method of claim 11, wherein the key mechanism includes a lock cylinder that receives the key to unlock the manual actuator, and the key is only removable from the lock cylinder when the lock cylinder is in a locked position.

16. The method of claim 11, wherein:

the at least one remote latch mechanism on the egress side of the door includes:

a first remote latch mechanism positioned at an upper edge of the door;

a second remote latch mechanism positioned at a lower edge of the door;

the first remote latch mechanism is connected to an upper control rod portion;

the second remote latch mechanism is connected to a lower control rod portion;

the upper and lower control rod portions are connected to one another with a bracket assembly; and the latch control mechanism is connected to the bracket assembly to simultaneously displace the upper and lower control rod portions to manipulate the first and second remote latch mechanisms when the latch control mechanism is manipulated from the deactuated state to the actuated state.

17. An exit device assembly configured for mounting to a door, the exit device assembly comprising:

a pushbar assembly configured for mounting to an egress side of the door, the pushbar assembly including a pushbar movable between a projected positon and a depressed position;

a trim configured for mounting to a non-egress side of the door, the trim including a handle;

at least one remote latch mechanism for mounting on the egress side of the door and configured lock the door in a closed position;

a latch control mechanism mounted to the door, the latch control mechanism being operably connected to the at least one remote latch mechanism with a control rod, the latch control mechanism further being operably connected to the pushbar, the latch control mechanism further being operably connected to the handle with an input mechanism, wherein movement of the pushbar from the projected position to the depressed position moves the latch control mechanism from a deactuated state, in which remote latch mechanism locks the door in the closed position, to an actuated state, in which the at least one remote latch mechanism is controlled by the latch control mechanism to allow the door to be moved from the closed position;

a key mechanism on the non-egress side of the door, the key mechanism including a lock cylinder and a manual actuator that is selectively locked and unlocked by manipulation of the lock cylinder, wherein the manual actuator is connected to the control rod such that rotation of the manual actuator, when the key cylinder is unlocked, axially displaces the control rod to manipulate the latch control mechanism from the deactuated state to the actuated state; and a trim lock device on the egress side of the door, the trim lock device being movable by a user on the egress side between a blocking position, in which the trim lock device blocks the input mechanism to prevent the handle of the trim from manipulating the latch control mechanism from the deactuated state to the actuated state, and an unblocking position, in which the handle of the trim is operable to manipulate the latch control mechanism from the deactuated state to the actuated state.

18. The exit device assembly of claim 17, wherein:

the handle of the trim cannot be rotated to an unlocked position while the trim lock device is in the blocking position, and the handle of the trim is always unlocked when the trim lock device is in the unblocking position; and the manual actuator of the key mechanism is always unable to be rotated to the unlocked position unless the manual actuator is unlocked with a key in the key cylinder.

19. The exit device assembly of claim 17, wherein:

the trim lock device includes a turn member and a lug engaged to the turn member, wherein in the blocking position, the lug is positioned to block movement of the input mechanism by the handle of the trim; and the trim lock device includes an indicator connected to the turn member, the indicator including a first indicium corresponding to the blocking position and a second indicium corresponding to the unblocking position.

* * * * *